(12) United States Patent
Versaw

(10) Patent No.: US 6,484,672 B1
(45) Date of Patent: Nov. 26, 2002

(54) CAT TRAP/CARRIER/CAGE

(76) Inventor: Marie H. Versaw, 765 Buck Run Rd., Versailles, KY (US) 40383

( * ) Notice: Subject to any disclaimer, the term of this patent is extended or adjusted under 35 U.S.C. 154(b) by 0 days.

(21) Appl. No.: 09/762,570
(22) PCT Filed: Sep. 12, 2000
(86) PCT No.: PCT/US00/24913
§ 371 (c)(1), (2), (4) Date: Feb. 8, 2001
(87) PCT Pub. No.: WO01/65932
PCT Pub. Date: Sep. 13, 2001

Related U.S. Application Data
(60) Provisional application No. 60/187,391, filed on Mar. 7, 2000.

(51) Int. Cl.$^7$ .......................... A01M 23/24; A01K 1/02
(52) U.S. Cl. ............................................. 119/751; 43/61
(58) Field of Search ........................ 43/60–62; 119/452, 119/453, 454, 473, 475, 479, 481, 482, 496, 501, 751, 752

(56) References Cited

U.S. PATENT DOCUMENTS

| | | |
|---|---|---|
| 275,969 A | 4/1883 | Woodside |
| 3,791,347 A | 2/1974 | Lovell |
| 3,834,063 A | 9/1974 | Souza et al. |
| 3,875,902 A | 4/1975 | Gasper |
| 3,918,406 A | 11/1975 | Patterson |
| 4,138,796 A * | 2/1979 | Souza ........................... 43/61 |
| 4,590,703 A | 5/1986 | Cutter |
| 4,590,704 A | 5/1986 | Volk |
| 4,770,127 A | 9/1988 | Volk |
| 4,827,872 A * | 5/1989 | Sommers ..................... 119/482 |
| 4,912,872 A | 4/1990 | Wynn et al. |
| 4,991,543 A | 2/1991 | Silberman |
| 5,092,270 A | 3/1992 | Simons et al. |
| 5,199,210 A | 4/1993 | Nastas |
| 5,251,572 A * | 10/1993 | Frame et al. ................ 119/417 |
| 5,329,723 A | 7/1994 | Liul |
| 5,503,107 A * | 4/1996 | Satcher et al. .............. 119/496 |
| 5,577,464 A * | 11/1996 | Wellington et al. ......... 119/452 |
| 5,778,594 A | 7/1998 | Askins et al. |
| 5,791,292 A | 8/1998 | Jempolsky |
| 5,797,350 A * | 8/1998 | Smith .......................... 119/454 |
| 5,845,432 A | 12/1998 | Tully et al. |
| 5,862,624 A | 1/1999 | Askins |

FOREIGN PATENT DOCUMENTS

| WO | WO 86/05657 | 10/1986 |
|---|---|---|

* cited by examiner

Primary Examiner—Peter M Poon
Assistant Examiner—Son T. Nguyen
(74) Attorney, Agent, or Firm—Richard C. Litman

(57) ABSTRACT

A cat trap and cage for capturing, transporting, and temporarily housing stray, unclaimed, or feral cats. The trap is an elongated, box-shaped enclosure having a trap door at one end and a guillotine type sliding door at the other end. The trap door is mounted on hinges attached to the top wall of the cage and actuated when the cat steps on a rectangularly shaped pedal in the floor of the enclosure, causing the trap door to rotate to a closed position in order to trap the cat inside the enclosure. The guillotine door is used to obtain normal access to the cat, and the trap may be locked end to end with a litter box having a similar guillotine door. The trap door includes a detachable "squeeze" panel which may be used to urge the cat against the guillotine door at the other end of the enclosure.

14 Claims, 6 Drawing Sheets

CAT TRAP/CARRIER/CAGE

CROSS-REFERENCE TO RELATED APPLICATION

This application claims the benefit of U.S. Provisional Patent Application Ser. No. 60/187,391 filed Mar. 7, 2000.

TECHNICAL FIELD

The present invention relates generally to animal traps. More specifically, the invention is a combination trap and portable cage used to capture and transport feral cats or similar animals.

BACKGROUND ART

Numerous cage-like animal traps have been devised in an effort to control the populations of animals that have the potential of becoming a nuisance or sources for transmitting infectious disease. Most of the conventional traps or cages are constructed of iron rods arranged in a grid structure and having parallel pairs of nearly identical rectangular sides. Some have trap doors present at either end or both ends. These doors are usually mounted with side edge or top edge axles. Others use vertical translationally sliding doors alternately called "guillotine" doors. Central-split folding doors with a torsional spring providing tension about the axle along the center-split are also used. An animal trap which provides a dual function as a carriage and feeder with multiple access mechanisms as herein described is lacking in the following referenced patents.

For example, U.S. Pat. No. 3,834,063, issued to Souza, et al., discloses a metal grid trap with folding doors in which each half is subjected to the torsional force of a spring directed toward straightening the door and closing the entrance. No top edge axle rotating door or vertical translationally sliding doors are used.

U.S. Pat. No. 4,590,703, issued to Volk, discloses a trap door that rotates on a horizontally oriented axle along the top edge of the entrance. A pair of vertical bars mounted on the right and left edges of the trap door are bound to the corresponding parts of a similar pair of vertical bars attached to the frame of the same door. This is done with a ring that encircles both left-hand bars and another encircling the two right-hand bars. When the door closes the rings fall so that the door can not be opened easily by raising the rings from within the cage. When the trip pedal is moved a rod pulls the door enough to start its fall, but gravity is primarily responsible for closing the door. It is assumed that the acceleration of gravity will produce a sufficient velocity to close the cage in time to prevent a last split-second escape.

U.S. Pat No. 4,912,872 issued to Wynn, et al., discloses a wire mesh cage and a trap door that latches shut upon closure. The same concerns mentioned above apply here. A small animal carrier cage is described in U.S. Pat. No. 5,092,270, issued to Simon et al., which discloses a dual compartmented enclosure. One compartment is a closed-walled room with a litter box serving as the floor. The other compartment is partly enclosed like a conventional cage with a door at one end and a passage way to the litter box room at the other. This size and design appear to be insufficient in order to have a trapping mechanism integrated within the context of the carrier.

U.S. Pat. No. 5,199,210, issued to Nastas, discloses a vertical translationally sliding door activated by movement of a food tray held by a rod that acts like a pendulum. This trap is supposedly safer for the animal due to its length. This trap is not meant to serve as a carrier or temporary accommodation. U.S. Pat. No. 5,778,594, issued to Askins, et al., discloses a trap with a vertical sliding door at each end. A spring loaded rod extends into an empty slot on a rotating cam when the rotation is caused by the motion of a trip pan. The slippage of the rod causes it to withdraw from a slot in the vertical door. This trap can be folded in order to take up less space. This trap does not appear to be meant to serve as a carrier or temporary living facility for the animal.

U.S. Pat. No. 5,791,292, issued to Jempolsky, discloses a carrier made of solid material with ventilation holes on the vertical panels. One panel is a vertically sliding door and the bottom panel is a sliding floor that can be removed. As a trap, this device is not operated without direct human control. This device has to be maneuvered over the animal to be caught.

U.S. Pat. No. 5,862,624, issued to Askins, discloses a collapsible trap with a door that rotates about a horizontal axle mounted inside the trap. This door is forced downward by a reactionary plate that rotates about a horizontal axis mounted on the bottom edge of the door. A torsional spring forces the door and reactionary plate apart once the trip pedal is pressed. This trap can be folded and stored. It does not have some of the amenities of a temporary living facility.

Another example of a patent for a cage trap is describe in the W.I.P.O. Patent WO 86/05657, issued to Nicholls et al. This patent discloses a cage with a door that is horizontally and pivotally mounted on the end of the cage, but the door rotates into the cage where it is held by a trigger hook. This trap is good for long animals. As a temporary facility it is similar to other traps previously mentioned.

Most of the conventional cage traps are cages and/or traps constructed of a metallic grid material or partly sheet metal. In U.S. Pat. No. 5,092,270, issued to Simons, et al., a closed-walled compartment is utilized which means the animal within can not be seen. While Simons teaches a portable dual compartment cage, it is not a modularized portable cage. U.S. Pat. No. 5,791,292, issued to Jempolsky, discloses a similar transport enclosure with limited materials or the use of silicone materials for relative contact between moving surfaces.

None of the above inventions and patents, taken either singly or in combination, is seen to describe the instant invention as claimed.

DISCLOSURE OF INVENTION

The cat trap according to the invention is a container for capturing, transporting, and temporarily housing stray, unclaimed, or feral cats and similar small nuisance mammals. The trap is an elongated, box-shaped enclosure having a trap door at one end and a guillotine type sliding door at the other end. The trap door is mounted on hinges attached to the top wall of the cage and actuated when the cat steps on a rectangularly shaped pedal in the floor of the enclosure, causing the trap door to rotate to a closed position in order to trap the cat inside the enclosure. The guillotine door is used to obtain normal access to the cat, and the trap may be locked end to end with a litter box having a similar guillotine door. The trap door includes a detachable "squeeze" panel which may be used to urge the cat against the guillotine door at the other end of the enclosure. Food and water are provided in drawers slidable though a side wall of the enclosure. The walls of the enclosure are made from an opaque, thermally insulated material, except for the guillotine door, which provides the trapped cat with his only source of illumination and ventilation.

BRIEF DESCRIPTION OF THE DRAWINGS

Similar reference characters denote corresponding features consistently throughout the attached drawings.

MODES FOR CARRYING OUT THE INVENTION

The present invention is a combination cat trap/carrier/cage, designated generally as 10 in FIGS. 1 through 6 and hereinafter referred to as the "cat trap". The cat trap 10 may be used as a trap for trapping feral cats, as a carrier for transporting a cat, or as a cage for temporarily housing a cat. The cat trap 10 has a unique combination of features, including a guillotine sliding door at one end, a trap door rotating about horizontally disposed hinge pins, and a squeeze panel built in to the trap door.

Figure 1:
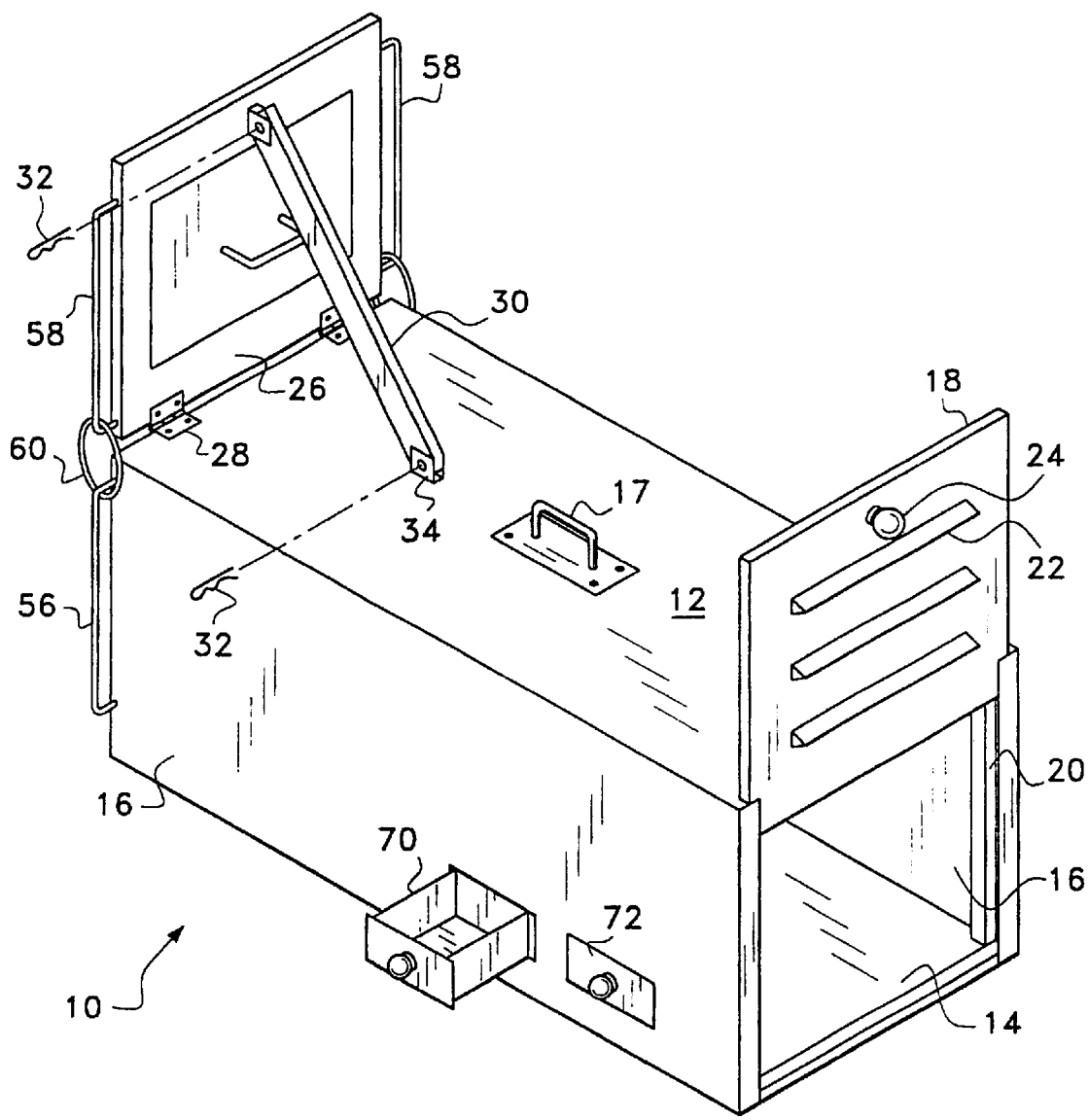
FIG. 1 is a perspective view of a cat trap/carrier/cage according to the present invention.
Figure 2:
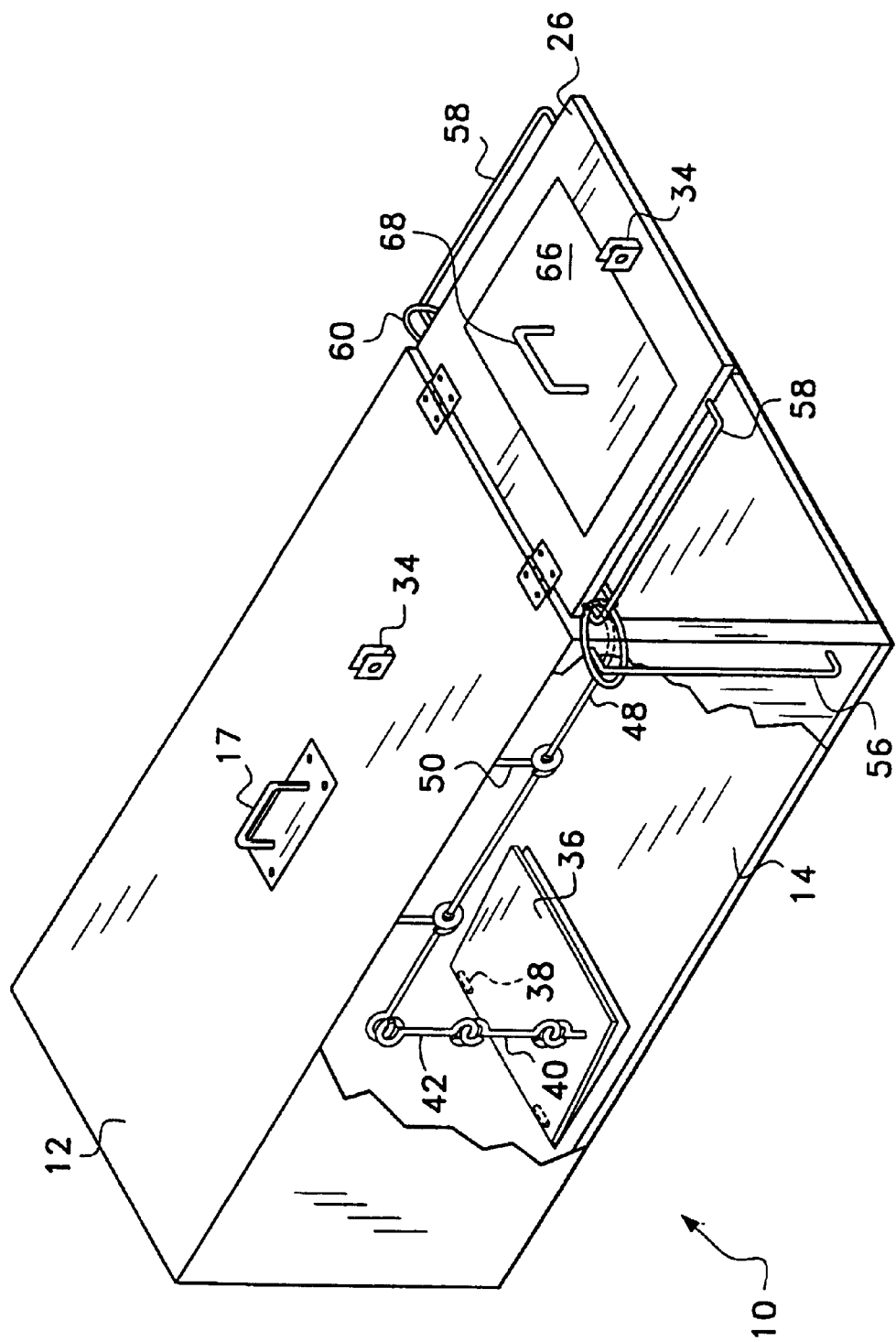
FIG. 2 is an perspective view of the cat trap/carrier/cage according to the present invention with a side broken away to show the trip mechanism.

As shown in FIG. 1, the cat trap 10 is an elongated, box-shaped, rectangular parallelepiped structure made from an opaque, thermally insulated material. The cat trap may be made from a thermoplastic material, and may have a double wall with insulating material disposed between the walls. The roof 12, floor 14, and two opposing side walls 16 of the structure are fixed. The roof may have a carrying handle 17 disposed thereon to enable the cat trap 10 to be used as a carrier for transporting the animal. At one end the cat trap 10 has a guillotine type door 18 which is slidable vertically. The door may, for example, be slidable in U-shaped channels 20 disposed on the opposing side walls 16.

The guillotine door 18 provides a cat enclosed therein with its only source of air and light. This may be accomplished in any manner known in the art. The door may have a plurality of slats disposed horizontally which are separated by a predetermined distance, or, as shown in FIG. 1, the guillotine door 18 may have a plurality of vents 22, which may be made from transparent polycarbonate or other suitable material. It is preferred that the walls of the cat trap 10 be opaque in order to prevent a cat which has been trapped or enclosed in the device from being startled or frightened by sudden movements which may occur outside the trap 10, hence the air and light are limited to entering the trap 10 only through the sliding guillotine door 18. The guillotine door 18 may also be provided with a door knob 24, pull, or a flange upon its upper edge to facilitate raising the door 18.

At the end opposite the guillotine door 18, the cat trap is provided with a trap door 26 which rotates about one or more horizontally disposed hinges 28 along the roof 12 of the cat trap 10. Although the hinges 28 are shown attached to the exterior of the cat trap 10, it will be obvious that the hinges 28 may be disposed inside the trap 10. The trap door 26 may be braced in an open position by a removable bar 30 which may be attached to the trap door 26 at one end and the roof 12 at the other end by hitch pins 32 inserted through aligned holes in the bar 30 and brackets 34. This feature may be useful when the cat trap 10 is used as a carrier or temporary cage and it is desired to acclimate the cat to the trap 10.

The cat trap 10 has a trip mechanism which is used when the device is used to trap a feral cat. Although any trip mechanism may be used, a preferred form of trip mechanism is shown in more detail in FIGS. 2 through 4. The trip mechanism has a substantially rectangular trip pedal 36 pivotally attached to the floor 14 by hinges 38. A corner of the trip pedal 36 is attached to vertical disposed link rods 40 and 42. Link rod 42 has a loop 44 at its upper end which engages a loop 46 at the end of elongated stop rod 48. Stop rod 48 is supported by struts 50 suspended from the roof 12, and terminates with a stop 52 disposed normal to the rod 48. Trap door 26 has a trip rod 54 disposed normal to the door 26 and extending towards the interior of the trap 10.

Figure 3:
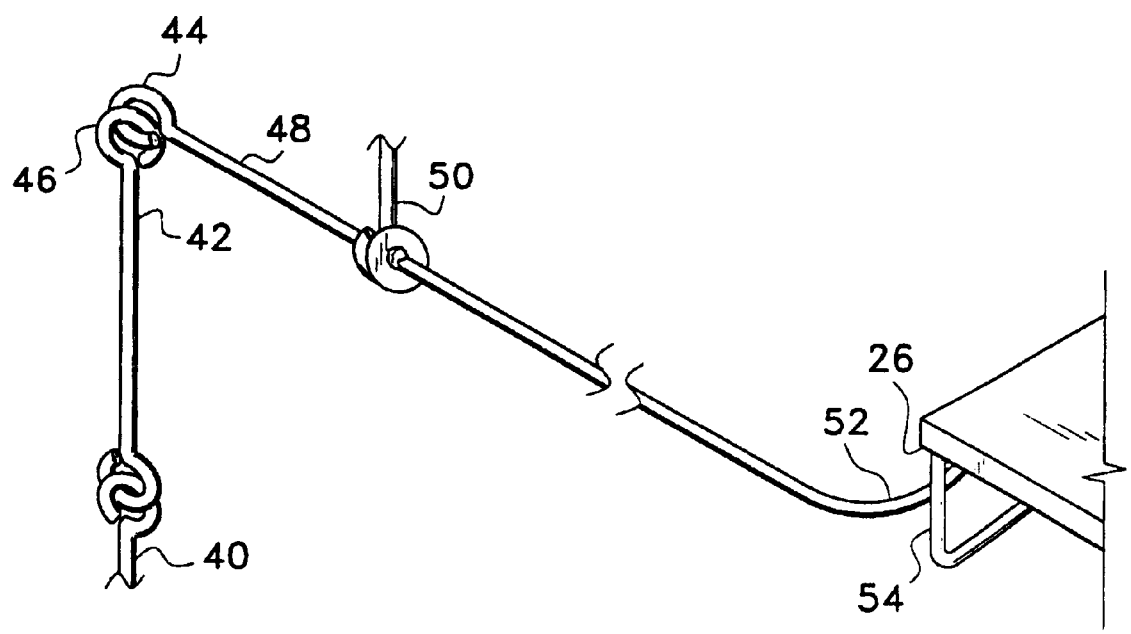
FIG. 3 is a perspective view showing details of the trip mechanism of the cat trap/carrier/cage according to the present invention.
Figure 4:
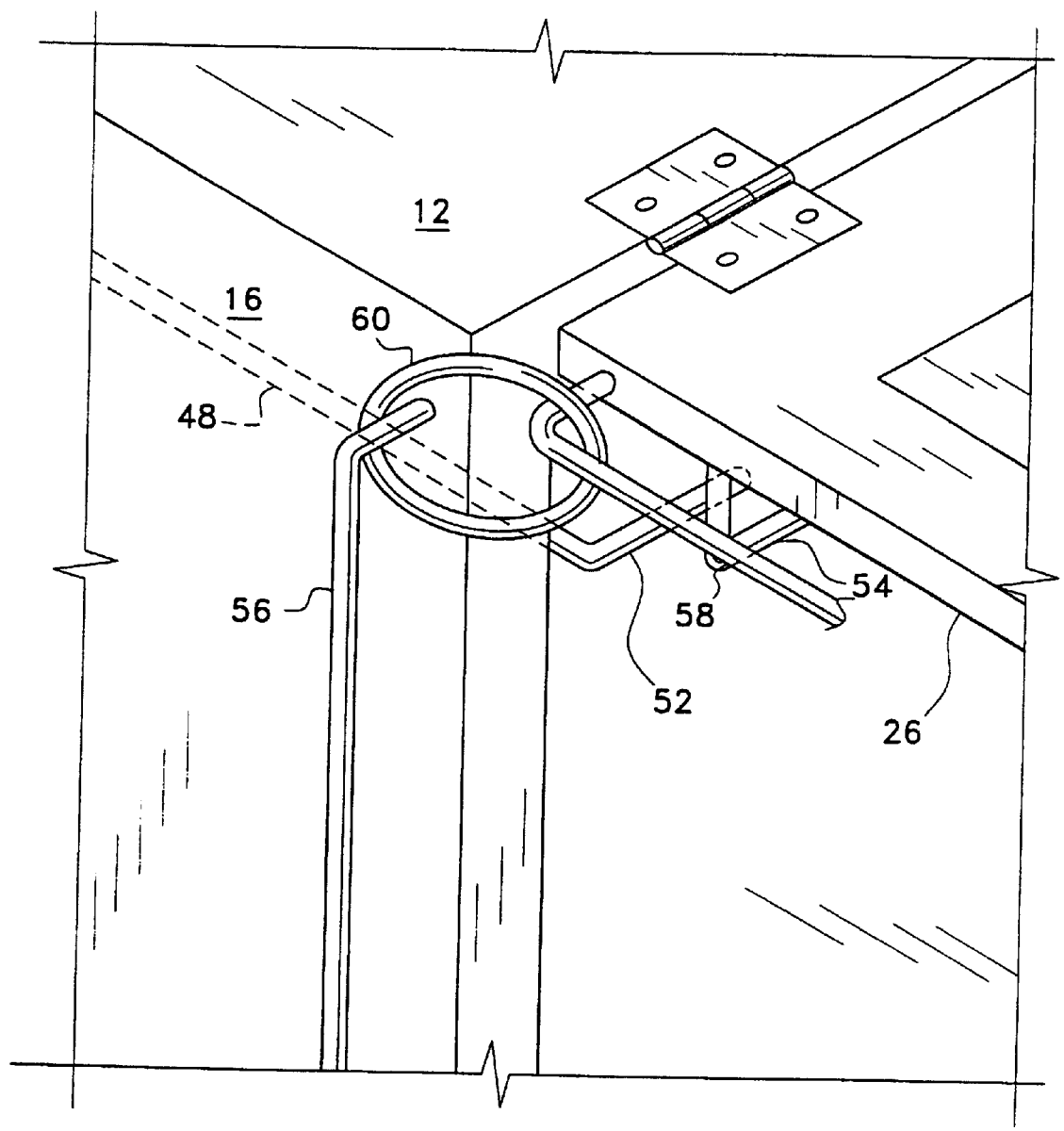
FIG. 4 is a perspective view showing details of the trap door locking mechanism of the cat trap/carrier/cage according to the present invention.

In order to set the trap, the trap door 26 is raised and the stop rod 48 is rotated counterclockwise to place the stop 52 parallel to the floor 14 and the door 26 lowered to brace the trip rod 54 against the stop 52, as shown in FIG. 3. The counterclockwise rotation of the stop rod 48 also disposes loop 46 in a horizontal plane, pulling link rods 40 and 42 upward and lifting trip pedal 36, thereby setting the trap. When a cat steps on the trip pedal 36, the cat's weight forces trip pedal 36 down flush against the floor 14, pulling vertical rods 40 and 42 down, and rotating loop 46 into a vertical plane, which causes stop 52 to rotate to a vertical plane in which it no longer supports trip rod 54, causing the trap door 26 to rotate to a closed position by gravity.

The cat trap 10 has a trap door locking mechanism to prevent a cat from opening the trap door 26 after being enclosed in the trap 10. The latch mechanism comprises a first pair of rods 56 extending parallel to the opposing side walls 16 adjacent the trap door 26, and a second pair of rods 58 extending parallel to the sides to the trap door 26. A latch ring 60 encircles each pair of rods 56 and 58 on opposite sides of the trap door 26. Latch rings 60 must be raised to the top of the rods 56 and 58 in order to raise the trap door 26 and set the trip mechanism. Once the trap has sprung, latch rings 60 slide down parallel rods 56 and 58 by gravity.

It will be seen that the trip mechanism of the present invention is similar to the trip mechanism described by Volk in U.S. Pat. No. 4,590,704. However, the trip mechanism of the present invention differs from that described by Volk in that: (1) the rings 60 and rods 40, 42, 48, 54, 56 and 58 are either made from silicone, or from metal coated with silicone, so that the cat is not unduly frightened or enraged by the clanking of metal rods when the trap is sprung; (2) the trap door 26 is not made from bars, but the same opaque, thermoplastic material as the remainder of the trap 10 to give the cat a greater sense of security than would occur with a trap door that the cat can see through; (3) the rings 60 and latch rods 56 and 58 are located on the exterior of the trap; and (4) because of (3), the trap door 26 may have a squeeze panel defined therein, as set forth below.

Figure 5:
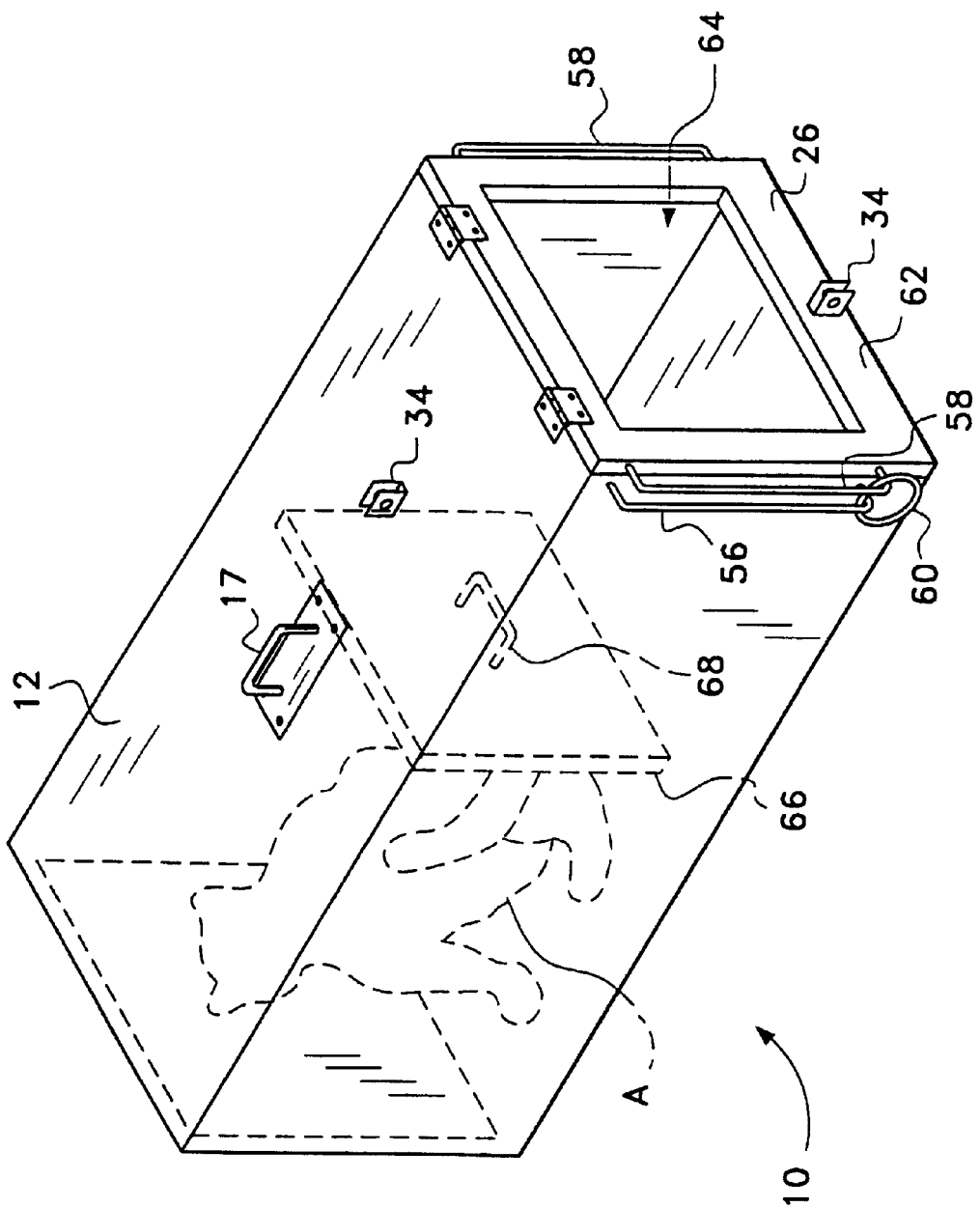
FIG. 5 is a perspective view of the cat trap/carrier/cage according to the present invention showing use of the squeeze panel.

The trap door 26 may be constructed with a substantially rectangular frame 62 to which the hinges 28, trip rod 54, and bracket 34 are attached, and a central rectangular opening 64 in which a detachable squeeze panel 66 is disposed. The squeeze panel 66 preferably occupies a substantial portion of the length and width of the trap door 26, and may be temporarily secured to the trap door 26 by any conventional means, e.g., a plurality of magnetic catches (not shown) disposed about the periphery of the rectangular opening and a plurality of striker plates (not shown) disposed about the periphery of the squeeze panel 66. The squeeze panel 66 has a handle 68 on its front face for ease in handling. As shown in FIG. 5, the squeeze panel 66 is provided so that the squeeze panel 66 may be detached from the trap door 26 and pushed into the interior of the cat trap 10 to force a cat A to the opposite side of the enclosure against the guillotine door 18, where the cat A may be forced into an adjacent enclosure, grasped for removal from the trap 10, administered a sedative or anesthesia through a port (not shown) in the guillotine door 18, or for numerous other purposes.

The cat trap 10 includes a food drawer 70 slidable through an opening in one of the opposing sides 16, and a water drawer 72 slidable though a second opening in the side wall 16. The drawers 70 and 72 are preferably not removable from the trap 10, but retained by a flange of flanges on the rear wall of the drawer, and may be temporarily secured in the wall by catches so that the drawers 70 and 72 may not be pushed open from inside the trap 10, or accidentally fall open when the trap 10 is used as a carrier for transporting the animal.

Figure 6:
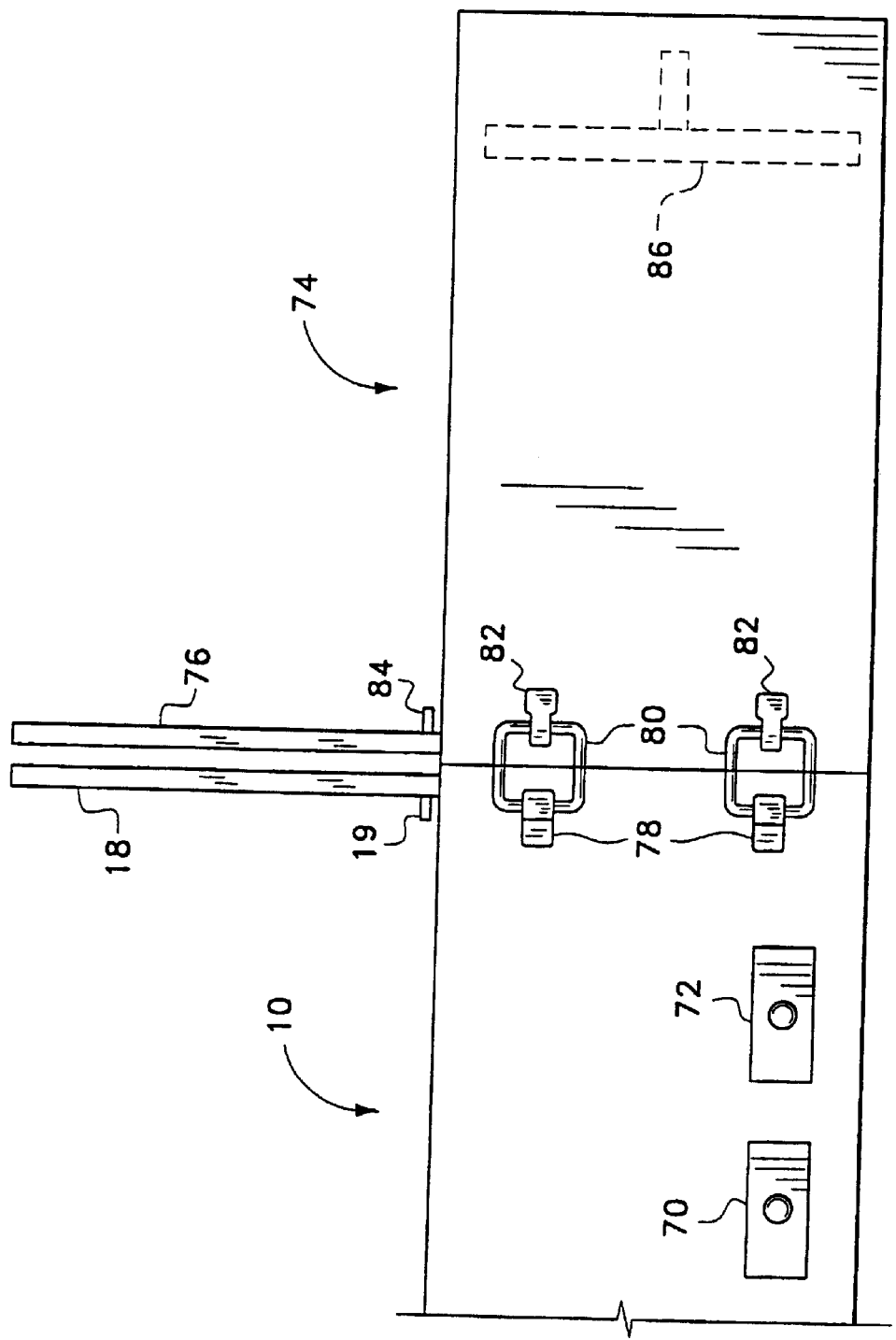
FIG. 6 is a fragmented side view of a litter box with a squeeze door moored to the cat trap/carrier/cage according to the present invention.

The cat trap 10 may be used in conjunction with a litter box 74, as shown in FIG. 6. The litter box 74 is a rectangular parallelepiped structure having substantially the same dimensions as the trap 10 and having walls constructed from the same thermally insulated material as the trap 10. At one end the litter box 74 has a slidable guillotine door 76 substantially identical in structure and function as the guillotine door 18 of the trap 10. The litter box 74 may be placed against the cat trap 10 with the guillotine doors 18 and 76 in abutting contact and temporarily joined to each other end-to-end by any conventional means, such as latches 78 with a pivoting wire loop 80 which may be latched into a catch 82 on the abutting enclosure.

The guillotine doors 18 and 76 may have any conventional mechanism for locking the doors 18 and 76 in an open position, such as spring biased buttons 19 and 84 which extend outside the channels 20 when the doors 18 and 76 are raised above a predetermined height, and which must be compressed to lower the doors 18 and 76 into a closed position. After the cat trap 10 and litter box 74 have been latched together, the guillotine doors 18 and 76 may be raised and locked in an open position so that a cat may freely cross from one enclosure into the other.

The end of the litter box 74 opposite the guillotine door 76 may be equipped with a squeeze panel 86 substantially similar in structure and function to the squeeze panel 66. Thus, when it is desired to detach the litter box 74 from the cat trap 10, the squeeze panel 86 may be used to urge the cat from the litter box 74 into the trap 10, after which the guillotine door 18 may be closed to contain the cat in the trap 10. The litter box 74 is a useful attachment for maintaining sanitation in the cat trap 10, and for providing extended living quarters when the cat trap is used as a cage.

It will be seen that the cat trap 10 provides an apparatus which can be used to capture, transport, or temporarily house feral or unclaimed cats in a manner consistent with practices that minimize stress for the cat and handler alike. The cat trap 10 may also be used to provide a means for rendering the cat in a position to be sedated or otherwise treated without subjecting the veterinarian or medical technician to an undue risk. The cat trap 10 further keeps the captured cat in an enclosure with opaque walls so as to prevent the trapped cat from incurring stress from movements in the outside environment.

Although the present invention has been described as a cat trap, it will be understood that the cat trap 10 may also be useful as a trap/carrier/cage for other small animals. It is to be understood that the present invention is not limited to the sole embodiments described above, but encompasses any and all embodiments within the scope of the following claims.

I claim:
1. A cat trap, carrier and cage for trapping, transporting and housing small animals, comprising;
   a) an elongated box-shaped enclosure having a roof, a floor, a pair of opposing side walls joining the roof to the floor, a first open end and a second open end;
   b) a vertically slidable guillotine door disposed in the first open end of said box-shaped enclosure having an open position when the guillotine door is raised and a closed position for enclosing the first open end when the door is lowered;
   c) a trap door rotatably disposed at the second open end of said box-shaped enclosure, the trap door being rotatable about a horizontal axis on the roof of said enclosure between an open position and a closed position;
   d) a squeeze panel detachably disposed in said trap door for squeezing a cat against said guillotine door;
   e) a trip means for tripping said trap door between the trap door open position and the trap door closed position for trapping a cat; and
   f) a litter box having a roof, a floor, two opposing side walls joining said roof to said walls, a first end having a guillotine door slidably disposed therein, and a second end having a squeeze wall detachably disposed therein;
   g) wherein said litter box is attachable end to end with said cat trap, the guillotine door of said cat trap and the guillotine door of said litter box being latched in an open position in order to provide communication between said cat trap and said litter box.

2. The cat trap, carrier and cage according to claim 1, wherein said trip means comprises:
   a) a trip pedal rotatably attached to said floor;
   b) at least one link rod attached to said trip pedal, the rod being vertically disposed and having a loop at an end of the link rod;
   c) a stop rod having a stop disposed normal to the stop rod at one end, and a loop at a second end linked to the loop of said link rod, the stop rod being horizontally disposed and extending between said link rod and the second open end of said box-shaped enclosure; and
   d) a trip rod extending normal to said trap door, said stop rod being rotatable between a set position in which said stop is rotatable between a set position in which said stop is disposed horizontally, supporting the trip rod when said trap door is open and raising said trip pedal, and a tripped position, in which said stop is rotated 90° to a vertical position when an animal steps on said trip pedal, removing the stop from support of said trap door, allowing said trap door to rotate to the trap door closed position.

3. The cat trap, carrier and cage according to claim 2, further comprising:
   a) a first enclosure rod extending parallel to one wall of said opposing side walls;
   b) a second enclosure rod extending parallel to the other wall of said opposing side walls;

c) a first trap door rod extending parallel to a side of said trap door;

d) a second trap door rod extending parallel to an opposing side of said trap door;

e) a first latch ring encircling and slidably disposed on said first enclosure rod and said first trap door rod;

f) a second latch ring encircling and slidably disposed on said second enclosure rod and said second trap door rod; and g) wherein said first latch ring and said second latch ring are slidable between a first position adjacent said trap door's attachment to the roof of said enclosure, whereby said trap door may be opened, and a second position adjacent the floor of said enclosure, whereby said trap door is latched closed.

4. The cat trap, carrier and cage according to claim 3, wherein said trip pedal, said at least one link rod, said stop rod, said trip rod, said first and second enclosure rods, said first and second trap door rods, and said first and second latch rings are made from silicone.

5. The cat trap, carrier and cage according to claim 3, wherein said trip pedal, said at least one link rod, said stop rod, said trip rod, said first and second enclosure rods, said first and second trap door rods, and said first and second latch rings are made from a metal coated with silicone rubber.

6. The cat trap, carrier and cage according to claim 1, wherein the roof and opposing side walls of said enclosure, said guillotine door, said trap door, and said squeeze panel are made from an opaque material.

7. The cat trap, carrier and cage according to claim 1, wherein the roof and opposing side walls of said enclosure, said guillotine door, said trap door, and said squeeze panel are made from a thermoplastic material.

8. The cat trap, carrier and cage according to claim 1, wherein the roof and opposing side walls of said enclosure, said guillotine door, said trap door, and said squeeze panel are made from a thermally insulated material.

9. The cat trap, carrier and cage according to claim 1, further comprising a bar having a first end removably attached to said roof and having a second end removably attached to said trap door for temporarily bracing said trap door in an open position.

10. The cat trap, carrier and cage according to claim 1, further comprising:

a) a first drawer slidably disposed in one of said opposing side walls for containing food; and b) a second drawer slidably disposed in one of said opposing side walls for containing water.

11. The cat trap, carrier and cage according to claim 1, wherein said guillotine door further comprises a means for providing a cat enclosed within the cage with a source of light and air.

12. The cat trap, carrier and cage according to claim 1, wherein said guillotine door further comprises a plurality of vents.

13. The cat trap, carrier and cage according to claim 1, further comprising means for temporarily latching said guillotine door in an open position.

14. The cat trap, carrier and cage according to claim 13, wherein said means for latching said guillotine door comprises a spring biased button disposed adjacent a side of said guillotine door.

\* \* \* \* \*